United States Patent
Cupit

(10) Patent No.: US 8,359,390 B2
(45) Date of Patent: Jan. 22, 2013

(54) METHOD AND SYSTEM FOR PROVISIONING SERVICES ON A COMMUNICATION NETWORK

(75) Inventor: John E. Cupit, Plano, TX (US)

(73) Assignee: Fujitsu Limited, Kawasaki-She (JP)

( * ) Notice: Subject to any disclaimer, the term of this patent is extended or adjusted under 35 U.S.C. 154(b) by 2560 days.

(21) Appl. No.: 10/954,521

(22) Filed: Sep. 29, 2004

(65) Prior Publication Data

US 2006/0075102 A1 Apr. 6, 2006

(51) Int. Cl.
*G06F 15/173* (2006.01)
(52) U.S. Cl. ......... 709/226; 709/223; 709/224; 709/225
(58) Field of Classification Search .................. 709/223, 709/224, 225, 226
See application file for complete search history.

(56) References Cited

U.S. PATENT DOCUMENTS

| | | | | |
|---|---|---|---|---|
| 6,804,722 B1* | 10/2004 | Nishi | ............................ | 709/234 |
| 7,194,756 B2* | 3/2007 | Addington et al. | ............ | 725/116 |
| 7,254,645 B2* | 8/2007 | Nishi | ............................ | 709/249 |
| 7,363,363 B2* | 4/2008 | Dal Canto et al. | ............ | 709/223 |
| 2004/0261116 A1* | 12/2004 | Mckeown et al. | ............ | 725/109 |

OTHER PUBLICATIONS

"*CISCO CNS Network Registrar 6.1*", Data Sheet, Cisco Systems, Inc., 4 pages;http://www.cisco.com/application/pdf/en/us/guest/products.
"*Netcool+Tivoli: delivering service management innovation*", service management solutions, white paper, IBM; Corporation, Somers, NY, 28 pages; ftp:ftp.software.ibm.com/software/tivoli/whitepapers.
"*TIBCO Hawk, The Power of Now*", brochure, TIBCO Software Inc.., 2 pages; http:www.tibco.com/resources/software/systemmonitoring/hawk.

* cited by examiner

*Primary Examiner* — Djenane Bayard
*Assistant Examiner* — Umar Cheema
(74) *Attorney, Agent, or Firm* — Baker Botts L.L.P.

(57) ABSTRACT

A method for provisioning a service on a communication network includes receiving a service order comprising a service request. The service request relates to a service provided on a communication network. The method includes analyzing the service order to determine a plurality of network elements to provision to complete the service request and one or more network resources of the communication network required to complete the service request. The method includes retrieving a configuration profile for each of the plurality of network elements and reserving the one or more network resources of the communication network required to complete the service request. The method also includes preparing a service template for each of the plurality of network elements using the configuration profile for each of the plurality of network elements. The service templates are capable of being delivered to respective network elements for execution. The method also includes delivering each service template to a respective network element for execution to fulfill the service order.

33 Claims, 2 Drawing Sheets

METHOD AND SYSTEM FOR PROVISIONING SERVICES ON A COMMUNICATION NETWORK

TECHNICAL FIELD OF THE INVENTION

The present invention relates generally to communication networks and, more particularly, to a method and system for provisioning services on a communication network.

BACKGROUND OF THE INVENTION

Communication networks are used to provide a number of different types of communication services to subscribers. Providers of these services utilize communication networks of varying size and complexity, many of which include a plurality of different types of network elements that cooperate to provide the communication services. Many such network elements include their own management system for configuration, alteration and basic management of the network element.

SUMMARY OF THE INVENTION

The present invention provides a method and system for provisioning a service on a communication network that substantially eliminates or reduces at least some of the disadvantages and problems associated with previous methods and systems.

In accordance with a particular embodiment of the present invention, a method for provisioning a service on a communication network includes receiving a service order comprising a service request. The service request relates to a service provided on a communication network. The method includes analyzing the service order to determine a plurality of network elements to provision to complete the service request and one or more network resources of the communication network required to complete the service request. The method includes retrieving a configuration profile for each of the plurality of network elements and reserving the one or more network resources of the communication network required to complete the service request. The method also includes preparing a service template for each of the plurality of network elements using the configuration profile for each of the plurality of network elements. The service templates are capable of being delivered to respective network elements for execution. The method also includes delivering each service template to a respective network element for execution to fulfill the service order.

Preparing the service template for each of the plurality of network elements may comprise correlating service parameters of the service request, the configuration profile for each of the plurality of network elements and the reserved one or more network resources; and populating each service template with task primitives associated with a respective network element. The method may also include analyzing the service order to determine whether the service order relates to a legitimate service and updating a database of available network resources as the reserved one or more network resources are utilized. Delivering each service template to a respective network element for execution may comprise delivering each service template to a respective network element according to one or more schedule parameters. At least two of the plurality of network elements may utilize unique management systems requiring different types of task primitives to configure, alter or manage the network elements. The service request may comprise a subscriber request to provision a new service for the subscriber on the communication network, a subscriber request to alter a current service provisioned on the communication network for the subscriber or a subscriber request to resolve a problem for the subscriber with a current service provisioned on the communication network.

In accordance with another embodiment, a system for provisioning a service on a communication network includes an interface operable to receive a service order comprising a service request. The service request relates to a service provided on a communication network. The system includes a service provisioning manager coupled to the interface. The service provisioning manager is operable to analyze the service order to determine a plurality of network elements to provision to complete the service request and one or more network resources of the communication network required to complete the service request. The service provisioning manager is also operable to retrieve a configuration profile for each of the plurality of network elements, reserve the one or more network resources of the communication network required to complete the service request and prepare a service template for each of the plurality of network elements using the configuration profile for each of the plurality of network elements. The service templates are capable of being delivered to respective network elements for execution. The system also includes a delivery manager coupled to the service provisioning manager, the delivery manager operable to deliver each service template to a respective network element for execution to fulfill the service order.

Technical advantages of particular embodiments of the present invention include a Universal Element Management Framework (UEMF) which isolates multiple element management systems from the service management layer of a telecommunication provider's Operational Support System (OSS). As such, a telecommunication provider can make changes in network elements and such changes may become transparent to the service management layer.

Particular embodiments include an element management system that may receive a service order relating to a service request for a communication network, analyze the service order and configure, provision or otherwise manage the appropriate network elements to fulfill the service order. The element management system is able to provision network elements of various vendors and types, even if such network elements have their own management systems requiring a particular type of task primitives. Accordingly, operational costs and labor associated with the fulfillment of service orders requiring provisioning of various types of network elements are reduced.

Particular embodiments support end-to-end management oversight of multiple network elements from various vendors. This supports the measurement and maintenance of service level agreements for the service orders provisioned on the various types of network elements positioned at the access, metro transport, edge and core of the telecommunication provider's network.

Particular embodiments support flow-thru provisioning in a single element management system, in which configuration templates (as opposed to operating system software blades) are used to automate provisioning. The template approach allows a user to make configuration template changes, as opposed to requiring a new "blade" whenever additional functionality is released for a particular network element. Thus, particular embodiments provide a universal, multi-vendor element management system that is user-configurable which, as a result, may decrease support and development costs for providing communication services.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
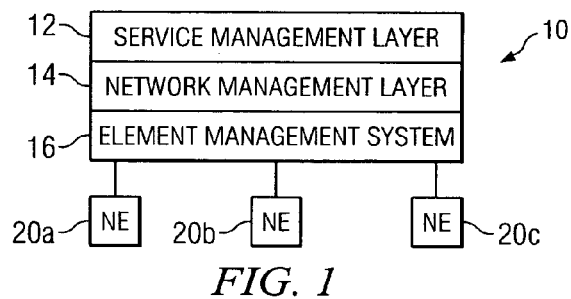
FIG. 1 illustrates a system for providing subscriber communication services with an element management system, in accordance with a particular embodiment.

FIG. 1 illustrates a system 10 for providing subscriber communication services, in accordance with a particular embodiment. System 10 may be administered, operated and managed by one or more organizations providing communication services to subscribers through one or more communication networks. Provided communication services may include, for example, optical ethernet services, including but not limited to point-to-point (E-Line services); point to multipoint (E-LAN services); managed L2 services, such as Frame Relay or ATM service interworking with Ethernet services and PWE3 aggregation services and managed IP services, such as managed security services, managed VPN services and Virtual Private LAN services (VPLS). In the illustrated embodiment, system 10 includes a service management layer (SML) 12, a network management layer (NML) 14, an element management system (EMS) 16 and network elements 20.

SML 12 manages service attributes for a particular service to ensure the service meets a service level agreement. For example, a service provider may provide a T1 frame relay service or an E-line service with a specific committed information rate (CIR) as part of a Service Level Agreement. SML 12 monitors the service rate to ensure that the customer is receiving the appropriate service level.

NML 14 manages one or more network domains being utilized in the provision of a service. NML 14 may comprise a "manager of managers" (MOM) that enables the creation of topological maps of network architectures. For example, NML 14 may indicate, in graphical or non-graphical form, the occurrence of various network events, such as when network elements are inoperable and when links are down. In particular embodiments, NML 14 may comprise a MOM, such as HP Open View (HPOV) or Netcool.

EMS 16 interacts with, provisions and otherwise manages network elements 20 to provide communication services to subscribers of system 10. Particular functions of EMS 16 are discussed in further detail below with respect to FIG. 2.

Network elements 20 comprise various elements and components of the communication network being utilized, such as Core Routers, Edge Routers, Multiservice Provisioning Platforms (MSPP), Multiservice switches, Optical Ethernet switches, Optical Add/Drop Multiplexers (OADMs) and Wave Division Multiplexing platforms (DWDM or CWDM platforms). In some cases, network elements 20 may be manufactured by different vendors and thus may be operated or managed by different, vendor-specific management systems. For example, network element 20a manufactured be Vendor A may be managed by a Vendor A management system unique from that used to manage network element 20b manufactured by Vendor B. The different management systems may require different types of primitives to configure, alter and/or otherwise manage the respective network elements. The integration of each such management system into system 10 can be difficult and expensive, as a service provider using these network elements may have to maintain various software and hardware applications of different vendors and a separate middleware and workflow management product to support the integration of these different vendor management systems into a seamless OSS architecture.

Particular embodiments provide an element management system that may receive a service order relating to a service request for a communication network, analyze the service order and configure, provision or otherwise manager the appropriate network elements to fulfill the service order. The element management system is able to provision network elements of various vendors and types, even if such network elements have their own management systems requiring particular types of task primitives. Accordingly, costs and labor associated with the fulfillment of service orders requiring provisioning of various types of network elements is reduced.

Figure 2:
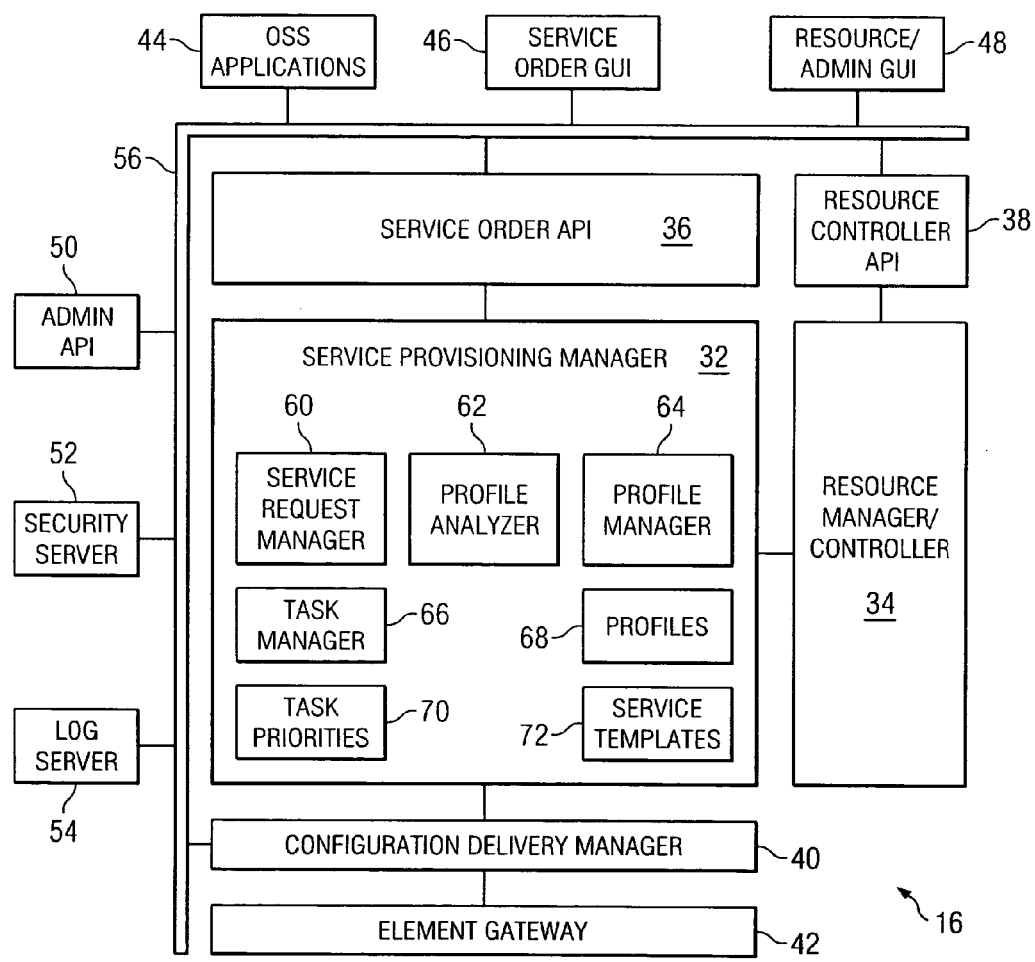
FIG. 2 illustrates the element management system of FIG. 1, in accordance with a particular embodiment.

FIG. 2 illustrates element management system 16, in accordance with a particular embodiment. EMS 16 comprises a service oriented architecture enabling a service provider to manage, change and provision network elements and their configurations without having to worry about manual integration of various management systems and without having to impact operations at the service management and network management layers. EMS 16 supports flow-thru provisioning in a single element management system, in which configuration templates (as opposed to operating system software blades) are used to automate provisioning. The template approach allows a user to make configuration template changes, as opposed to requiring a new "blade" whenever additional functionality is released for a specific network element when providing communication services.

EMS 16 includes service provisioning manager 32, resource manager/controller 34, service order API 36, resource controller API 38 and configuration delivery manager 40 connected to a gateway 42. EMS 16 additionally includes OSS applications 44, service order GUI 46, resource/admin GUI 48, admin API 50, security server 52 and log server 54. Particular components of EMS 16 may be connected to a bus 56, which may comprise a CORBA or XML bus in particular embodiments. In particular embodiments, components of EMS 16 may provide functionality through an API defined in, for example, CORBA IDL, SOAP or XML.

Service order API 36 receives service orders for provisioning through EMS 16. Service order API 36 provides a northbound programming interface for the addition, deletion, modification and query of services provided to a subscriber through a communication network. Service orders may also relate to resolving problems with the current provisioning of services.

Service provisioning manager 32 enables service provisioning on specified network elements. The process is highly customizable for the rollout of new services, supporting the customization of network element configuration through templates. The framework of service provisioning manager 32 enables the dynamic plug in of network element task primitives at runtime without having to recompile the system.

Service provisioning manager 32 provides a common and flexible framework for various provisioning solutions to process service requests in a consistent manner. Service provisioning manager 32 includes service request manager 60, profile analyzer 62, profile manager 64, task manager 66, profiles 68, task primitives 70 and service templates 72.

Service request manager 60 manages a service request as it arrives through a service order. Once a service request is received, service request manager 60 determines whether it is a valid service for the particular network and infrastructure associated with the subscriber or service, as network architectures of different geographic regions, for example, may offer different services. Service request manager 60 allows a service provider to create business rules concerning the type of service requests the provider is willing to provision on a particular communication network.

Profile analyzer 62 analyzes a service order received across service order API 36 to determine the network elements the service order is likely to touch or impact. This enables EMS 16 to determine the task primitives that may need to be used to create a configuration profile for those particular network elements.

Profile manager 64 maintains profiles 68 of the network elements that are needed to provide a defined service. As indicated above, the various network elements needed may utilize different, vendor-specific management systems. Profile manager 64 enables the creation of configuration templates operable for each of the network elements. A configuration template includes configuration parameters that need to be adjusted in the specific management system of a network element to make the necessary changes to network components to fulfill a service order. Profile manager 64 may match the configuration templates of particular devices to a service order for which the devices may be provisioned.

Task manager 66 fills in templates with appropriate task primitives 70 to complete a service template capable for dropping onto a network element for execution. Task primitives 70 are the actual commands used to configure, alter and/or manage network elements. As indicated above, various network elements may understand different types of task primitives. The task manager ensures that the required resources for the service to be provisioned are available before generating configuration files. For example, if required resources (such as IP addresses, VLANs, ports, etc.) are not available, then task manager 66 will return an error. When resource or configuration data is changed due to a service request, the profile for that service will invoke the proper task primitive for update in the resource repository of resource manager 34, further discussed below, and in the configuration of the involved network elements.

Service templates 72 comprise comma delimited files with the network element management system commands needed to configure the network elements for the provision of a particular service. Service templates 72 comprise task primitives necessary to configure, modify or otherwise provision one or more network elements to fulfill a service order.

Resource manager 34 maintains an inventory of equipment and resources necessary to provision services defined by service request manager 32. For example, a particular service may require a carrier VLAN and a certain amount of STS1s on a particular optical carrier to be provisioned. The inventory of resource manager 34 includes the network elements that need to be utilized to provide this service. Resource manager 34 is accessed by service provisioning manager 32 to determine availability of particular resources required to fulfill a service order. Resource manager 34 provides the capability to create, allocate, modify and delete resource and data elements. Resource manager 34 may be controlled by resource controller API 38. In addition, as the fulfillment of service orders changes availability of resources and equipment for future service provisioning, resource manager 34 automatically updates its data records to reflect such change in availability.

Configuration delivery manager 40 transmits completed service templates to gateway 42 for dropping onto network elements 20 for execution. In particular embodiments, configuration delivery manager 40 may transmit service templates to gateway 42 at particular times, such as at a particular time of the day. Thus, manager 40 allows a service provider to build specific business rules into when and how service templates are executed by network elements. These business rules may also account for customer preferences as to when and how service templates are executed. For example, a customer may prefer that changes be implemented between 2:00 and 3:00 AM. Configuration deliver manager 40 can then schedule transmission of service templates to network elements for execution at this time.

Configuration delivery manager 40 is connected to gateway 42, which may determine whether a comma delimited service template file needs to be converted to another format. If such a conversion is required, then gateway 42 may make the conversion. In particular embodiments, gateway 42 may support, for example, conversion to Telnet, SSH and XML, depending on the technology a particular network element craft port may understand. Gateway 42 may also detect syntax and parser errors during download to a network element and may return error messages. Gateway 42 may be integrated within EMS 16 or another system or deployed on a stand alone appliance, for example, a 1U Linux appliance. From gateway 42, the service templates are dropped onto network elements for execution.

Resource/Administrator GUI 48 provides a user-friendly graphical user interface for creation and management of resources pertaining to element, network and provisioning services. Thus, resource/administrator GUI 48 allows an operator of EMS 16 to make modifications to the system. The modifications may be made in case the system does not automatically detect changes in various parameters of a network through which services are provided (such as detecting when network elements are added to a network). Such modifications may include modifications to service request manager 60, such as adding or deleting services providing on a particular network; modifications to profile manager 62, such as adding or deleting configuration templates; and modifications to resource manager 34, such as adding or deleting resources available on the network. Resource/Administrator GUI 48 may provide multiple views of resources available in the system, each view representing a logical grouping or physical containment captured by EMS 16. In particular embodiments, the GUI may comprise a web browser GUI client and a Java Servlet-based GUI server.

Service order GUI 46 comprises a GUI that allows a customer service representative or other operator of EMS 16 to enter information to populate service orders for fulfillment by the system.

OSS applications 44 provides an API for integration of legacy Operational Support System software applications into bus 56. Particular applications which may be integrated may include legacy applications providing for the entry of service order information.

Log server 54 provides functions for creation of log records for audit trails. Log server 54 may receive messages generated by other servers or client programs and store them in an EMS 16 database. Log server 54 may then generate from the messages log records of transactions across EMS 16 for audit trails. In particular embodiments, the audit trails may be viewed through any suitable text editor, such as vi or emacs.

Security server 52 provides user authentication for security of EMS 16. Security server 52 may secure and authenticate any interaction from any user across bus 56, whether through resource/administrator GUI 48, service order GUI 46 or another application.

Administrator API 50 is used by an administrator of EMS 16 to set specific user rights for various users of EMS 16 and its components, such as customer service representatives populating service orders and technical representatives modifying network resources or profile information through resource/administrator GUI 48. As an example, an administrator may desire to give some users the ability to view available resources, services and/or templates and to give other users the ability to make modifications to EMS 16 and its components.

It should be understood that components of EMS 16 may be implemented in, or in connection with, any number, type or form of processors, controllers, memory modules or other components. For example, such components may be implemented in one or more suitable computing devices, logic modules or resources adapted to execute various types of computer instructions in various computer languages for implementing functions available within the system. Implementations utilizing memory (for example, to store profiles 68, task primitives 70 and service templates 72) may include any form of volatile or nonvolatile memory including, without limitation, magnetic media, optical media, random access memory (RAM), read only memory (ROM), removable media or any other suitable local or remote memory component. Components of EMS 16 may be combined and/or divided for processing according to particular needs or desires within the scope of the present invention.

Figure 3:
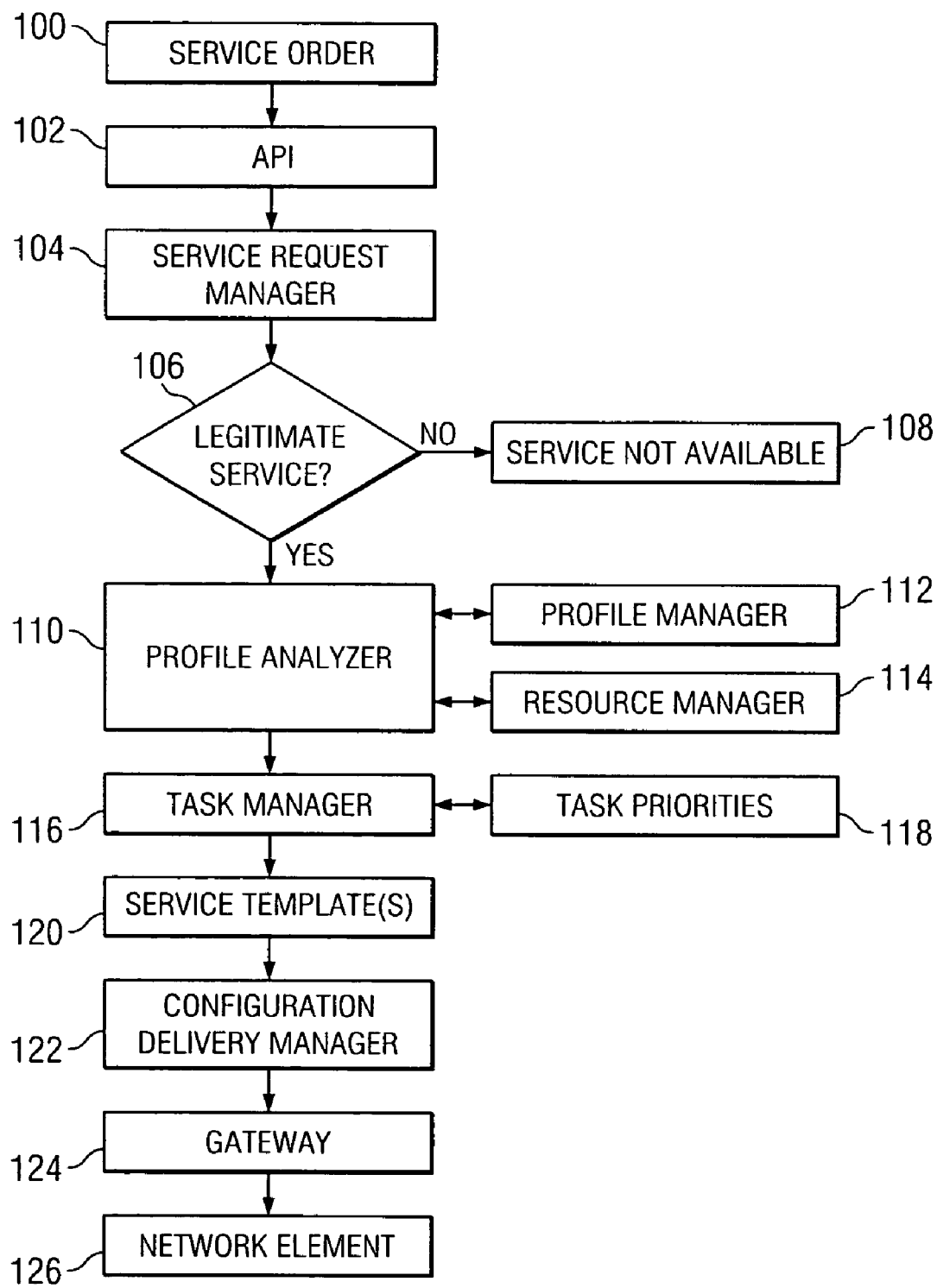
FIG. 3 illustrates a process flow diagram for provisioning a service on a communication network, in accordance with a particular embodiment.

FIG. 3 is a process flow diagram for provisioning a service on a communication network, in accordance with a particular embodiment. At step 100, a service order is received that relates to a service provided on a communication network. Any number of types of systems may create the service order. For example, in particular embodiments a Siebel system may create the service order received at step 100. At step 102, the received service order flows through an API, such as service order API 36 of EMS 16 of FIG. 2. The service order flows to a service request manager at step 104. At step 106, service request manager determines whether the service order relates to a legitimate service. The determination may include, for example, whether the service that is the subject of the service order is provided by or available at the particular network to which the service order relates. If the service order does not relate to a legitimate service, then the method proceeds to step 108, where a message indicating that the service is not available may be transmitted to an originator of the service order.

If it is determined that the service order relates to a legitimate service, then the service order flows to a profile analyzer at step 110 where the service order is analyzed. The profile analyzer determines what network elements must be provisioned to fulfill the service order and what network resources must be available for such fulfillment. To determine the network elements that must be provisioned, the profile analyzer interacts with a profile manager at step 112. The profile manager includes configuration profiles and other information and data relating to network elements of the applicable network. The profile analyzer also interacts with the resource manager at step 114 to reserve resources required to fulfill the service order. The resource manager includes a database of network resources and updates their availability as the network is used.

After the profile analyzer determines the needed network elements and reserves required resources for fulfilling the service order, the process proceeds to a task manager at step 116. The task manager interacts with task primitives at step 118 to create one or more service templates at step 120. To create the service template, the task manager correlates service parameters of the service order, templates of the network elements that need to be utilized or provisioned and the reserved network resources. The service template comprises a final configuration template that may be executed by a network element. In some embodiments, the service template may comprise a comma delimited format.

If multiple network elements must be provisioned, configured or otherwise utilized to fulfill the service order, then multiple service templates may be created such that each such network element receives a service template that it understands for execution. In particular embodiments, multiple service templates may be created to provision, configure or otherwise utilize multiple network elements of various brands or types to fulfill a particular service order according to the respective individual management systems of those network elements.

The service template flows to a configuration delivery manager at step 122. The configuration delivery manager delivers the service template based on rules that a service manager may create that govern the delivery of the service template. Such rules may be based upon, for example, time or manner of delivery of the service template. In particular embodiments, the configuration delivery manager may also perform an audit check on the service delivery to ensure legitimacy at step 122. At step 124, the configuration delivery manager delivers the service template to a gateway which may convert the template to an appropriate format, such as Telnet, SSH or XML. At step 126, the gateway delivers the service template to a network element for execution. The network element's execution of the service template fulfills the service order. As indicated above, in particular embodiments a service order may require use, modification or provisioning of multiple network elements. In such instance, multiple service templates may be created for execution at respective network elements. In some embodiments, once the service template is executed, the network element performing the execution may transmit a signal back to the element management system indicating successful or unsuccessful execution. In the event of unsuccessful execution, the configuration delivery manager will execute a roll back order to the network elements which were successfully executed and send an error code back to EMS 16.

Some of the steps illustrated in FIG. 3 may be combined, modified or deleted where appropriate, and additional steps may also be added to the diagram. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within element management system 16, including service provisioning manager 32 and resource manager/controller 34, these elements may be combined, rearranged or positioned in order to accommodate particular network or routing architectures or specific customer requirements. In addition, any of these elements included within element management system 16 may be provided as separate external components where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for provisioning a service on a communication network, comprising: receiving a service order comprising a service request, the service request relating to a service provided on a communication network; analyzing the service order to determine: a plurality of network elements to provision to complete the service request; and one or more network resources of the communication network required to complete the service request; retrieving a configuration profile for each of the plurality of network elements; reserving the one or more network resources of the communication network required to complete the service request; preparing a service template for each of the plurality of network elements using the configuration profile for each of the plurality of network elements, the service templates capable of being delivered to respective network elements for execution; and delivering each service template to a respective network element for execution to fulfill the service order.

2. The method of claim 1, wherein preparing the service template for each of the plurality of network elements comprises:
   correlating service parameters of the service request, the configuration profile for each of the plurality of network elements and the reserved one or more network resources; and populating each service template with task primitives associated with a respective network element.

3. The method of claim 1, further comprising analyzing the service order to determine whether the service order relates to a legitimate service.

4. The method of claim 1, further comprising updating a database of available network resources as the reserved one or more network resources are utilized.

5. The method of claim 1, wherein delivering each service template to a respective network element for execution comprises delivering each service template to a respective network element according to one or more schedule parameters.

6. The method of claim 1, further comprising converting one or more of the service templates to a separate format for delivery to a respective network element.

7. The method of claim 1, wherein at least two of the plurality of network elements utilize unique management systems requiring different types of task primitives to configure, alter or manage the network elements.

8. The method of claim 1, wherein execution of at least one of the service templates at a respective network element comprises an alteration of a configuration of the respective network element.

9. The method of claim 1, wherein the service request comprises a subscriber request to provision a new service for the subscriber on the communication network.

10. The method of claim 1, wherein the service request comprises a subscriber request to alter a current service provisioned on the communication network for the subscriber.

11. The method of claim 1, wherein the service request comprises a subscriber request to resolve a problem for the subscriber with a current service provisioned on the communication network.

12. A system for provisioning a service on a communication network, comprising:
   a processor and a memory storing instruction when executed by the processor comprising;
   an interface operable to receive a service order comprising a service request, the service request relating to a service provided on a communication network;
   a service provisioning manager coupled to the interface, the service provisioning manager operable to:
   analyze the service order to determine: a plurality of network elements to provision to complete the service request; and one or more network resources of the communication network required to complete the service request;
   retrieve a configuration profile for each of the plurality of network elements; reserve the one or more network resources of the communication network required to complete the service request; and prepare a service template for each of the plurality of network elements using the configuration profile for each of the plurality of network elements, the service templates capable of being delivered to respective network elements for execution; and a delivery manager coupled to the service provisioning manager, the delivery manager operable to deliver each service template to a respective network element for execution to fulfill the service order.

13. The system of claim 12, wherein a service provisioning manager operable to prepare the service template for each of the plurality of network elements comprises a service provisioning manager operable to: correlate service parameters of the service request, the configuration profile for each of the plurality of network elements and the reserved one or more network resources; and populate each service template with task primitives associated with a respective network element.

14. The system of claim 12, wherein the service provisioning manager is further operable to analyze the service order to determine whether the service order relates to a legitimate service.

15. The system of claim 12, further comprising a resource manager coupled to the service provisioning manager, the resource manager operable to update a database of available network resources as the reserved one or more network resources are utilized.

16. The system of claim 12, wherein a delivery manager operable to deliver each service template to a respective network element for execution comprises a delivery manager operable to deliver each service template to a respective network element according to one or more schedule parameters.

17. The system of claim 12, further comprising a gateway coupled to the delivery manager, the gateway operable to convert one or more of the service templates to a separate format for delivery to a respective network element.

18. The system of claim 12, wherein at least two of the plurality of network elements utilize unique management systems requiring different types of task primitives to configure, alter or manage the network elements.

19. The system of claim 12, wherein execution of at least one of the service templates at a respective network element comprises an alteration of a configuration of the respective network element.

20. The system of claim 12, wherein the service request comprises a subscriber request to provision a new service for the subscriber on the communication network.

21. The system of claim 12, wherein the service request comprises a subscriber request to alter a current service provisioned on the communication network for the subscriber.

22. The system of claim 12, wherein the service request comprises a subscriber request to resolve a problem for the subscriber with a current service provisioned on the communication network.

23. A non-transitory computer readable medium comprising code that when executed is operable to:
 receive a service order comprising a service request, the service request relating to a service provided on a communication network;
 analyze the service order to determine:
 a plurality of network elements to provision to complete the service request; and
 one or more network resources of the communication network required to complete the service request;
 retrieve a configuration profile for each of the plurality of network elements;
 reserve the one or more network resources of the communication network required to complete the service request;
 prepare a service template for each of the plurality of network elements using the configuration profile for each of the plurality of network elements, the service templates capable of being delivered to respective network elements for execution; and
 deliver each service template to a respective network element for execution to fulfill the service order.

24. The non-transitory medium of claim 23, wherein code operable to prepare the service template for each of the plurality of network elements comprises code operable to:
 correlate service parameters of the service request, the configuration profile for each of the plurality of network elements and the reserved one or more network resources; and
 populate each service template with task primitives associated with a respective network element.

25. The non-transitory medium of claim 23, wherein the code is further operable to analyze the service order to determine whether the service order relates to a legitimate service.

26. The non-transitory medium of claim 23, wherein the code is further operable to update a database of available network resources as the reserved one or more network resources are utilized.

27. The non-transitory medium of claim 23, wherein code operable to deliver each service template to a respective network element for execution comprises code operable to deliver each service template to a respective network element according to one or more schedule parameters.

28. The non-transitory medium of claim 23, further comprising code operable to convert one or more of the service templates to a separate format for delivery to a respective network element.

29. The non-transitory medium of claim 23, wherein at least two of the plurality of network elements utilize unique management systems requiring different types of task primitives to configure, alter or manage the network elements.

30. The non-transitory medium of claim 23, wherein execution of at least one of the service templates at a respective network element comprises an alteration of a configuration of the respective network element.

31. The non-transitory medium of claim 23, wherein the service request comprises a subscriber request to provision a new service for the subscriber on the communication network.

32. The non-transitory medium of claim 23, wherein the service request comprises a subscriber request to alter a current service provisioned on the communication network for the subscriber.

33. The non-transitory medium of claim 23, wherein the service request comprises a subscriber request to resolve a problem for the subscriber with a current service provisioned on the communication network.

* * * * *